(12) United States Patent
Swoboda

(10) Patent No.: US 7,519,497 B2
(45) Date of Patent: Apr. 14, 2009

(54) APPARATUS AND METHOD FOR STATE SELECTABLE TRACE STREAM GENERATION

(75) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 144 days.

(21) Appl. No.: 10/729,239

(22) Filed: Dec. 5, 2003

(65) Prior Publication Data

US 2004/0133388 A1 Jul. 8, 2004

Related U.S. Application Data

(60) Provisional application No. 60/434,184, filed on Dec. 17, 2002.

(51) Int. Cl.
G01M 19/00 (2006.01)
(52) U.S. Cl. ...................................................... 702/123
(58) Field of Classification Search ................ 702/117, 702/123, 17

See application file for complete search history.

(56) References Cited

U.S. PATENT DOCUMENTS 3,659,272 A * 4/1972 Price et al. ..................... 714/45
6,859,891 B2 * 2/2005 Edwards et al. ............... 714/30

* cited by examiner

Primary Examiner—Bryan Bui
Assistant Examiner—Stephen J Cherry
(74) Attorney, Agent, or Firm—Wad J. Brady, III; Frederick J. Telecky, Jr.

(57) ABSTRACT

A trace test and debug system for a target processor generates a program counter trace stream, a timing trace stream and a data trace stream. The target processor has three states, a program code execution state, an interrupt service routine code execution state, and a state where code execution is halted. The trace streams can be controlled so that the timing trace stream can be generated or excluded during the code execution halts. Similarly, when the timing trace stream is enabled for the interrupt service routine(s), the program counter and data trace streams can be selectively generated or excluded. The contents of the pipeline flattener can be held or flushed code execution halt depending on whether the pipeline is unprotected or protected. When the contents of the pipeline flattener are held during a code halt, the program counter trace stream and data trace stream is halted even if the timing trace stream remains active. When the contents of the pipeline flattener are flushed, the program counter and data trace streams are continued into the period of the code execution halt.

16 Claims, 14 Drawing Sheets

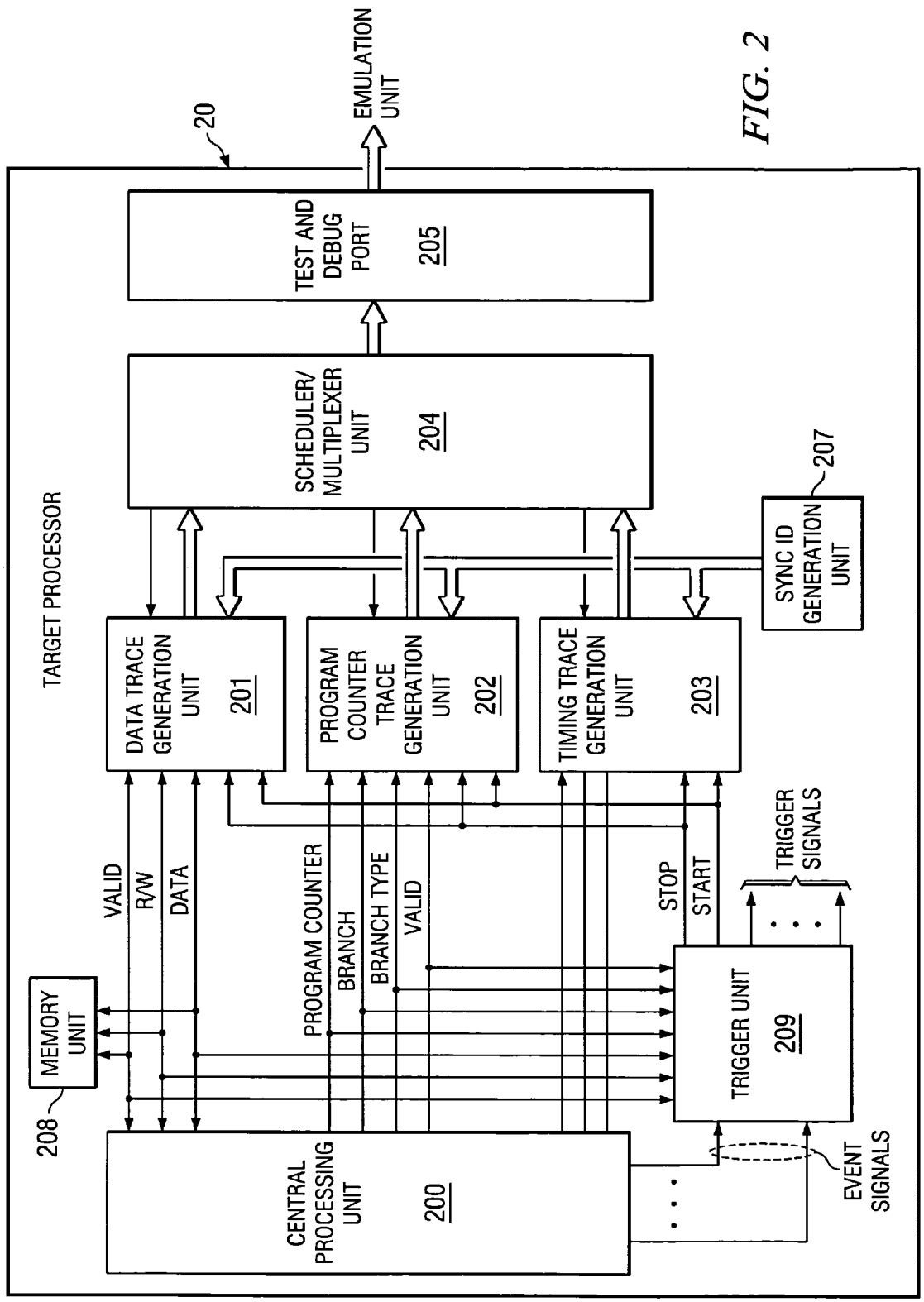

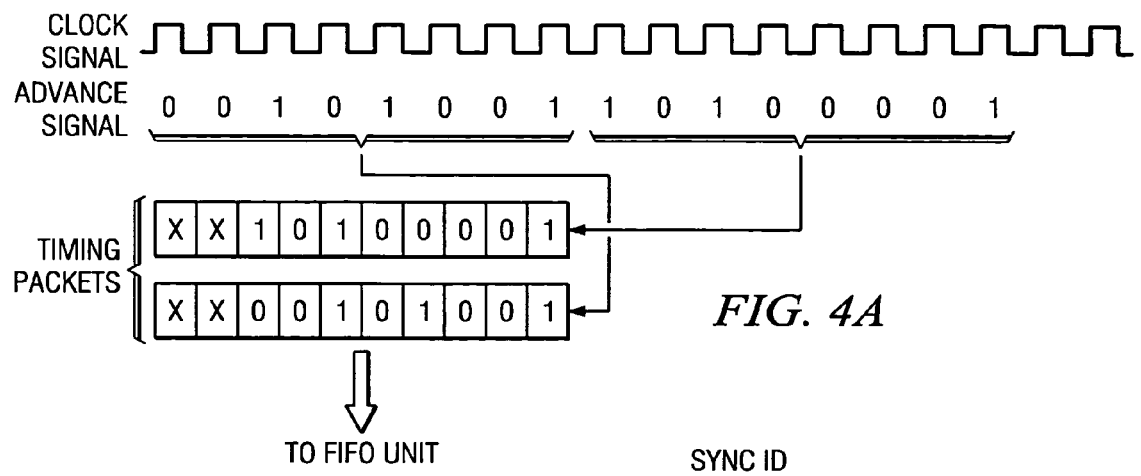
FIG. 4A
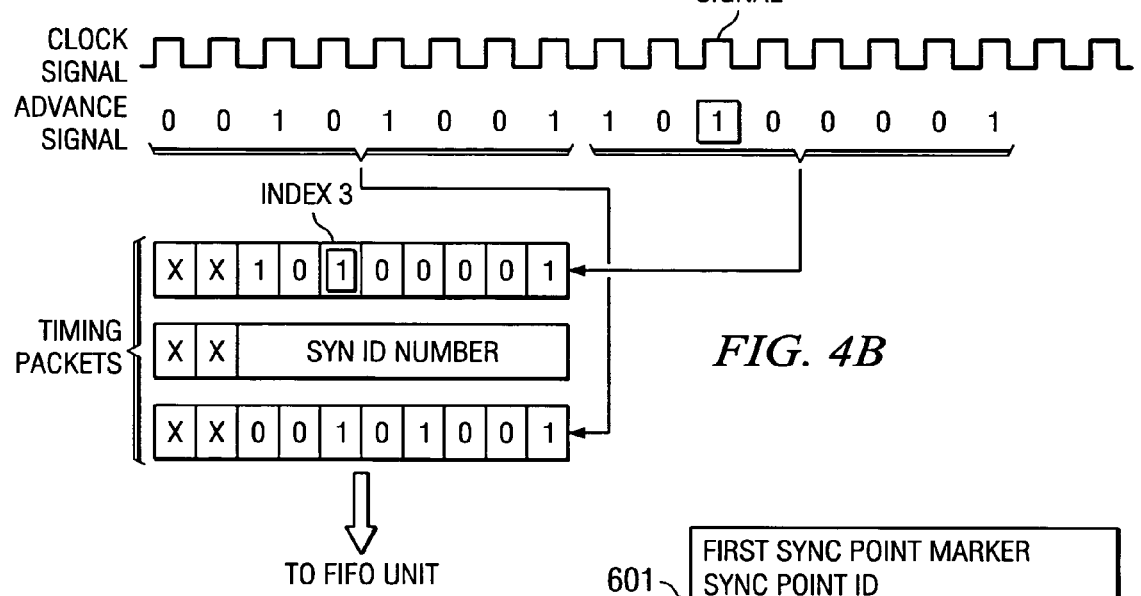
FIG. 4B
SYNC POINT TYPE
TYPE FAMILY
BRANCH INDEX
SYNC POINT ID
TIMING INDEX
TYPE DATA
ABSOLUTE PROGRAM
 COUNTER ADDRESS
PROGRAM COUNTER
 OFFSET ADDRESS
FIG. 5
601 — FIRST SYNC POINT MARKER
SYNC POINT ID
TIMING INDEX
ABSOLUTE PC VALUE
602 — PERIODIC SYNC POINT ID MARKER
SYNC POINT ID
TIMING INDEX
ABSOLUTE PC VALUE
603 — LAST SYNC POINT MARKER
SYNC POINT ID
TIMING INDEX
ABSOLUTE PC VALUE
FIG. 6A

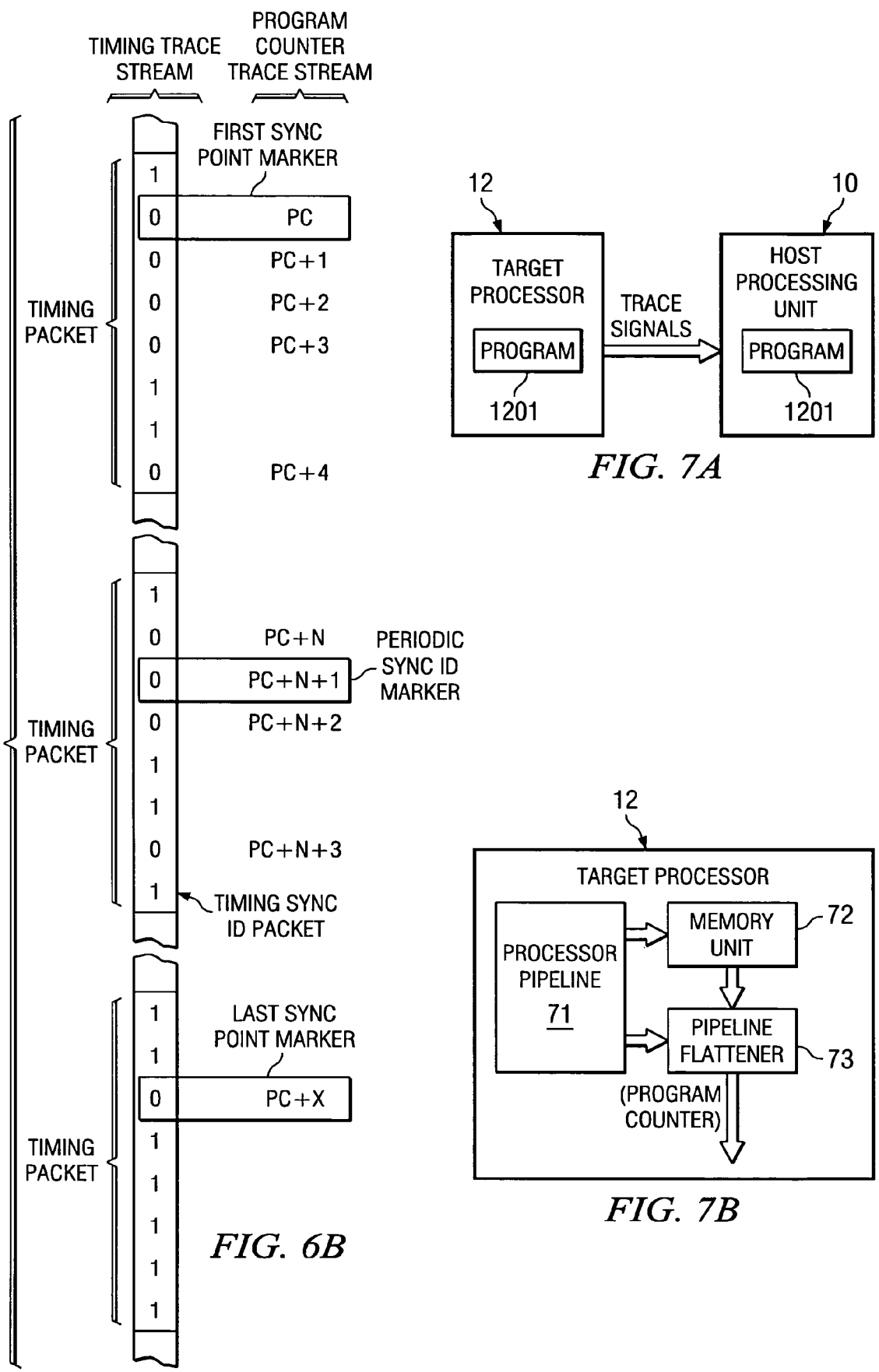

APPARATUS AND METHOD FOR STATE SELECTABLE TRACE STREAM GENERATION

This application claims priority under 35 USC §119(e) (1) of Provisional Application No. 60/434,184 (TI-34656P) filed Dec. 17, 2002.

RELATED APPLICATIONS

U.S. patent application Ser. No. 10/728,627, entitled APPARATUS AND METHOD FOR SYNCHRONIZATION OF TRACE STREAMS FROM MULTIPLE PROCESSING UNITS, invented by Gary L. Swoboda, filed on even date herewith, and assigned to the assignee of the present application; U.S. patent application Ser. No. 10/729,212, entitled APPARATUS AND METHOD FOR SEPARATING DETECTION AND ASSERTION OF A TRIGGER EVENT, invented by Gary L. Swoboda, filed on even date herewith, and assigned to the assignee of the present application; U.S. patent application Ser. No. 10/729,650, entitled APPARATUS AND METHOD FOR SELECTING PROGRAM HALTS IN AN UNPROTECTED PIPELINE AT NON-INTERRUPTIBLE POINTS IN CODE EXECUTION, invented by Gary L. Swoboda, filed on even date herewith, and assigned to the assignee of the present application; U.S. patent application Ser. No. 10/729,591, entitled APPARATUS AND METHOD FOR REPORTING PROGRAM HALTS IN AN UNPROTECTED PIPELINE AT NON-INTERRUPTIBLE POINTS IN CODE EXECUTION, invented by Gary L. Swoboda, filed on even date herewith, and assigned to the assignee of the present application; U.S. patent application Ser. No. 10/729,407, entitled APPARATUS AND METHOD FOR A FLUSH PROCEDURE IN AN INTERRUPTED TRACE STREAM, invented by Gary L. Swoboda, filed on even date herewith, and assigned to the assignee of the present application; U.S. patent application Ser. No. 10/729,564, entitled APPARATUS AND METHOD FOR CAPTURING AN EVENT OR COMBINATION OF EVENTS RESULTING IN A TRIGGER SIGNAL IN A TARGET PROCESSOR, invented by Gary L. Swoboda, filed on even date herewith, and assigned to the assignee of the present application; U.S. patent application Ser. No. 10/729,400, entitled APPARATUS AND METHOD FOR CAPTURING THE PROGRAM COUNTER ADDRESS ASSOCIATED WITH A TRIGGER SIGNAL IN A TARGET PROCESSOR, invented by Gary L. Swoboda, filed on even date herewith, and assigned to the assignee of the present application; U.S. patent application Ser. No. 10/729,592, entitled APPARATUS AND METHOD DETECTING ADDRESS CHARACTERISTICS FOR USE WITH A TRIGGER GENERATION UNIT IN A TARGET PROCESSOR, invented by Gary L. Swoboda and. Jason L. Peck, filed on even date herewith, and assigned to the assignee of the present application U.S. patent application Ser. No. 10/729,639, entitled APPARATUS AND METHOD FOR TRACE STREAM IDENTIFICATION OF A PROCESSOR RESET, invented by Gary L. Swoboda and Bryan Thome, filed on even date herewith, and assigned to the assignee of the present application; U.S. patent application Ser. No. 10/729,214591, entitled APPARATUS AND METHOD FOR TRACE STREAM IDENTIFICATION OF A PROCESSOR DEBUG HALT, invented by Gary L. Swoboda, Bryan Thome, Lewis Nardini, and Manisha Agarwala, tiled on even date herewith, and assigned to the assignee of the present application; U.S. patent application Ser. No. 10/729,327, entitled APPARATUS AND METHOD FOR TRACE STREAM IDENTIFICATION OF A PIPELINE FLATTENER PRIMARY CODE FLUSH FOLLOWING INITIATION OF AN INTERRUPT SERVICE ROUTINE; invented by Gary L. Swoboda and Bryan Thome, filed on even date herewith, and assigned to the assignee of the present application; U.S. patent application Ser. No. 10/729,647, entitled APPARATUS AND METHOD FOR TRACE STREAM IDENTIFICATION OF A PIPELINE FLATTENER SECONDARY CODE FLUSH FOLLOWING A RETURN TO PRIMARY CODE EXECUTION, invented by Gary L. Swoboda and Bryan Thome, filed on even date herewith, and assigned to the assignee of the present application; U.S. patent application Ser. No. 10/729, 401, entitled APPARATUS AND METHOD IDENTIFICATION OF A PRIMARY CODE START SYNC POINT FOLLOWING A RETURN TO PRIMARY CODE EXECUTION, invented by Gary L. Swoboda, filed on even date herewith, and assigned to the assignee of the present application; U.S. patent application Ser. No. 10/729,326, entitled APPARATUS AND METHOD FOR IDENTIFICATION OF A NEW SECONDARY CODE START POINT FOLLOWING A RETURN FROM A SECONDARY CODE EXECUTION, invented by Gary L. Swoboda, filed on even date herewith, and assigned to the assignee of the present application; U.S. patent application Ser. No. 10/729,190, entitled APPARATUS AND METHOD FOR TRACE STREAM IDENTIFICATION OF A PAUSE POINT IN A CODE EXECUTION SEQUENCE, invented by Gary L. Swoboda, filed on even date herewith, and assigned to the assignee of the present application; U.S. patent application Ser. No. 10/729,196, entitled APPARATUS AND METHOD FOR COMPRESSION OF A TIMING TRACE STREAM, invented by Gary L. Swoboda and Bryan Thome, filed on even date herewith, and assigned to the assignee of the present application; U.S. patent application Ser. No. 10/729,272, entitled APPARATUS AND METHOD FOR TRACE STREAM IDENTIFICATION OF MULTIPLE TARGET PROCESSOR EVENTS, invented by Gary L. Swoboda and Bryan Thome, filed on even date herewith, and assigned to the assignee of the present application; and U.S. patent application Ser. No. 10/729,191, entitled APPARATUS AND METHOD FOR OP CODE EXTENSION IN PACKET GROUPS TRANSMITTED IN TRACE STREAMS, invented by Gary L. Swoboda and Bryan Thome, filed on even date herewith, and assigned to the assignee of the present application are related applications.

BACKGROUND OF THE INVENTION

1. Field of the Invention

This invention relates generally to the testing of digital signal processing units and, more particularly, to the inclusion in the trace data streams of signals identifying selected events in the digital signal processors under test. These selected events are communicated to the testing apparatus by signal groups referred as sync markers.

2. Description of the Related Art

As microprocessors and digital signal processors have become increasingly complex, advanced techniques have been developed to test these devices. Dedicated apparatus is available to implement the advanced techniques. Referring to FIG. 1A, a general configuration for the test and debug of a target processor is shown. The test and debug procedures operate under control of a host processing unit 10. The host processing unit 10 applies control signals to the emulation unit 11 and received (test) data signals from the emulation unit 11 by cable connector 14. The emulation unit 11 applies control signals to and receives (test) signals from the target processing unit 12 by connector cable 15. The emulation unit 11 can be thought of as an interface unit between the host processing unit 10 and the target processor 12. The emulation unit 11 must process the control signals from the host processor unit 10 and apply these signals to the target processor 12 in such a manner that the target processor will respond with the appropriate test signals. The test signals from the target processor 12 can be a variety types. Two of the most popular test signal types are the JTAG (Joint Test Action Group) signals and trace signals. The JTAG signal provides a standardized test procedure in wide use. Trace signals are continuous signals from a multiplicity of junctions in the target processor 12. While the width of the bus interfacing to the host processing unit 10 generally have a standardized width, the bus between the emulation unit 11 and the target processor 12 can be increased to accommodate the increasing complexity of the target processing unit 12. Thus, part of the interface function between the host processing unit 10 and the target processor 12 is to store the test signals until the signals can be transmitted to the host processing unit 10.

Referring to FIG. 1B, the operation of the trigger generation unit 19 is shown. The trigger unit provides the main component by which the operation/state of the target processor can be altered. At least one event signal is applied to the trigger generation unit 19. Based on the identity of the event signal(s) applied to the trigger generation unit 19, a trigger signal is selected. Certain events and combination of events, referred to as an event front, generate a selected trigger signal that results in certain activity in the target processor such as a debug halt. Combinations of different events generating trigger signals are referred to as jobs. Multiple jobs can have the same trigger signal or combination of trigger signals. In the test and debug of the target processor, the trigger signals can provide impetus for changing state in the target processor or for performing a specified activity. The event front defines the reason for the generation of trigger signal. This information is important in understanding the operation of the target processor because, as pointed out above, several combinations of events can result in the generation of a trigger signal. In order to analyze the operation of the target processing unit, the portion of the code resulting in the trigger signal must be identified. However, the events in the host processor leading to the generation of event signals can be complicated. Specifically, the characteristics of an instruction at a program counter address can determine whether a trigger signal should be generated. A trigger signal can be an indication of when an address is within a range of addresses, outside of a range of addresses, some combination of address characteristics, and/or the address is aligned with a reference address. In this instance, the address can be the program address of an instruction or a memory address directly or indirectly referenced by a program instruction.

Trace techniques have assumed an increasing importance in the debug and test of target processors. In this technique, a plurality of streams of information, generally referred to as trace streams, are collected and transferred to the host processing unit for analysis. According to one embodiment of the trace testing technique, a timing stream, a data stream, and program controller stream supply the information. The timing trace stream relates generally to the system clock, the program counter trace stream relates to the executing program, and the data trace stream relates to the results of the executing program. These trace streams are analyzed by the host processor and the activity of the target processor can be reconstructed. The testing by the trace technique is limited by the large amount of data that is transferred from the target processor to host processing unit. The analysis of the target processor is further complicated by the fact that there are periods of processor inactivity. To minimize the transfer of data, the user may wish to avoid providing trace streams for all or selected trace streams during the periods of inactivity. Furthermore, the activity of a processor may be suspended in order to perform an interrupt service routine. It is frequently the situation that an interrupt service routine is known to execute as expected. Once again, the user may wish to eliminate either all of the trace streams associated with the interrupt service routine. When the apparatus includes a pipeline flattener, the interruption of the program execution can result in stored instructions being present in the pipeline flattener. The instructions stored in the pipeline flattener during an interruption of the program execution may or may not be needed for inclusion in the trace stream.

The operation of the target processor involves three states. In the normal code execution state, the execution of normal and interrupt service routines proceed as if there is no test and debug. In secondary code execution, the code is related to a real-time interrupt after a debug event has halted code execution. The central processor code execution is designated as real-time, allowing the service of interrupt designated as real-time after the code execution is halted. The third state involves not running code. No code execution occurs when the emulation functions are enabled, a debug event halts code execution, and no real-time interrupt is being serviced after the code execution is halted. A developer may wish to select during which states the trace data will be transferred to the host processing unit.

A need has been felt for apparatus and an associated method having the feature that selected trace streams can be disabled. It would be a further feature of the apparatus and associated method that selected trace streams can be disabled during a halt in the program execution. It would be yet a further feature of the present apparatus and associated method that selected trace streams can be disabled during an interrupt service routine. It would be a more particular feature of the apparatus and present invention to provide information in the trace streams relating to the instructions stored in the pipeline flattener during interruptions to the program execution.

SUMMARY OF THE INVENTION

The aforementioned and other features are accomplished, according to the present invention, by providing the target processor with at least two trace streams. One of the trace streams is a timing trace stream. The second trace stream is a program counter trace stream. A third trace stream is a data trace stream. Each of the trace streams is provided by an independent trace generation unit. The transmission of the generated trace stream is accomplished by a trigger unit. The trigger unit can be programmed to transmit selectively trace streams that are state dependent. Thus, if a trace generation unit is inactive, the port uses the bandwidth of the port to transmit the output of an active trace generation unit.

Other features and advantages of present invention will be more clearly understood upon reading of the following description and the accompanying drawings and the claims.

BRIEF DESCRIPTION OF THE DRAWINGS

FIG. 1A is a general block diagram of a system configuration for test and debug of a target processor, while

FIG. 2 is a block diagram of selected components in the target processor used the testing of the central processing unit of the target processor according to the present invention.

FIG. 4A illustrates format by which the timing packets are assembled according to the present invention, while FIG. 4B illustrates the inclusion of a periodic sync marker in the timing trace stream.

FIG. 5 illustrates the parameters for sync markers in the program counter stream packets according to the present invention.

FIG. 6A illustrates the sync markers in the program counter trace stream when a periodic sync point ID is generated, while FIG. 6B illustrates the reconstruction of the target processor operation from the trace streams according to the present invention.

FIG. 7A is a block diagram illustrating the apparatus used in reconstructing the processor operation from the trace streams according to the present invention, while FIG. 7B is a block diagram illustrating the where the program counter instruction identification determined for a target processor having a pipeline flattener according to the present invention.

FIG. 8A and FIG. 8B illustrate non-generation and the generation of a timing trace stream with no program counter and data trace streams during secondary code execution for a non-protected pipeline mode of operation, while

DESCRIPTION OF THE PREFERRED EMBODIMENT

1. Detailed Description of the Figures

Figure 1A:
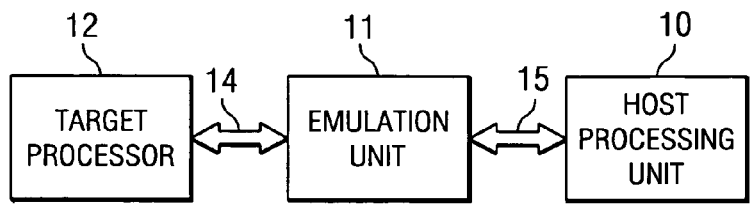
Figure 1B:
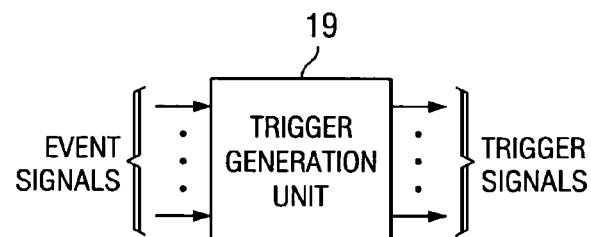
FIG. 1B illustrates a trigger unit in the target processor.

FIG. 1A and FIG. 1B have been described with respect to the related art.

Referring to FIG. 2, a block diagram of selected components of a target processor 20, according to the present invention, is shown. The target processor includes at least one central processing unit 200 and a memory unit 208. The central processing unit 200 and the memory unit 208 are the components being tested. The trace system for testing the central processing unit 200 and the memory unit 202 includes three packet generating units, a data packet generation unit 201, a program counter packet generation unit 202 and a timing packet generation unit 203. The data packet generation unit 201 receives VALID signals, READ/WRITE signals and DATA signals from the central processing unit 200. After placing the signals in packets, the packets are applied to the scheduler/multiplexer unit 204 and forwarded to the test and debug port 205 for transfer to the emulation unit 11. The program counter packet generation unit 202 receives PROGRAM COUNTER signals, VALID signals, BRANCH signals, and BRANCH TYPE signals from the central processing unit 200 and, after forming these signal into packets, applies the resulting program counter packets to the scheduler/multiplexer 204 for transfer to the test and debug port 205. The timing packet generation unit 203 receives ADVANCE signals, VALID signals and CLOCK signals from the central processing unit 200 and, after forming these signal into packets, applies the resulting packets to the scheduler/multiplexer unit 204 and the scheduler/multiplexer 204 applies the packets to the test and debug port 205. Trigger unit 209 receives EVENT signals from the central processing unit 200 and signals that are applied to the data trace generation unit 201, the program counter trace generation unit 202, and the timing trace generation unit 203. The trigger unit 209 applies TRIGGER and CONTROL signals to the central processing unit 200 and applies CONTROL (i.e., STOP and START) signals to the data trace generation unit 201, the program counter generation unit 202, and the timing trace generation unit 203. The sync ID generation unit 207 applies signals to the data trace generation unit 201, the program counter trace generation unit 202 and the timing trace generation unit 203. While the test and debug apparatus components are shown as being separate from the central processing unit 201, it will be clear that an implementation these components can be integrated with the components of the central processing unit 201.

Figure 3:
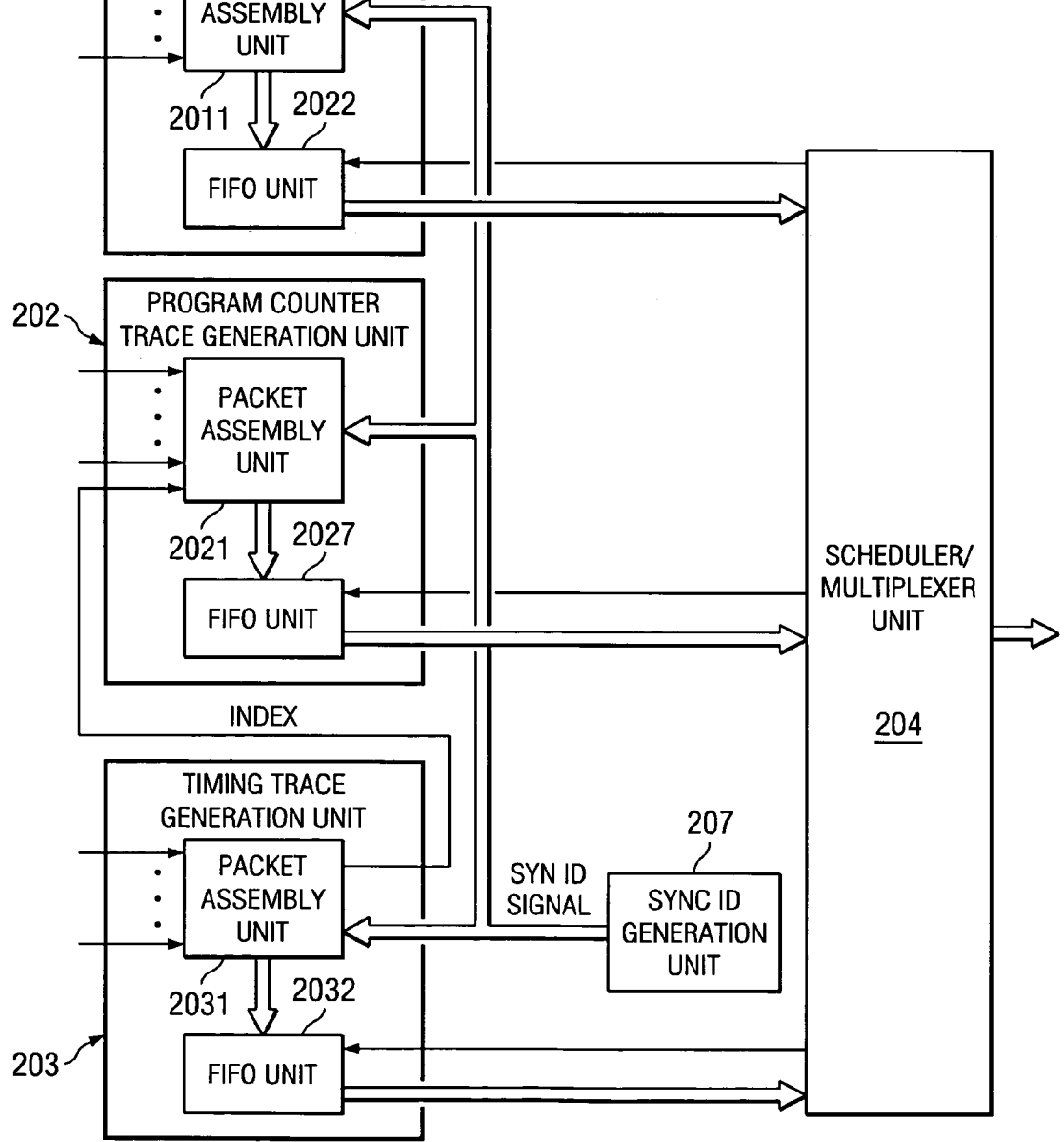
FIG. 3 is a block diagram of selected components of the illustrating the relationship between the components transmitting trace streams in the target processor.

Referring to FIG. 3, the relationship between selected components in the target processor 20 is illustrated. The data trace generation unit 201 includes a packet assembly unit 2011 and a FIFO (first in/first out) storage unit 2012, the program counter trace generation unit 202 includes a packet assembly unit 2021 and a FIFO storage unit 2022, and the timing trace generation unit 203 includes a packet generation unit 2031 and a FIFO storage unit 2032. As the signals are applied to the packet generators 201, 202, and 203, the signals are assembled into packets of information. The packets in the preferred embodiment are 10 bits in width. Packets are assembled in the packet assembly units in response to input signals and transferred to the associated FIFO unit. The scheduler/multiplexer 204 generates a signal to a selected trace generation unit and the contents of the associated FIFO storage unit are transferred to the scheduler/multiplexer 204 for transfer to the emulation unit. Also illustrated in FIG. 3 is the sync ID generation unit 207. The sync ID generation unit 207 applies an SYNC ID signal to the packet assembly unit of each trace generation unit. The periodic signal, a counter signal in the preferred embodiment, is included in a current packet and transferred to the associated FIFO unit. The packet resulting from the SYNC ID signal in each trace is transferred to the emulation unit and then to the host processing unit. In the host processing unit, the same count in each trace stream indicates that the point at which the trace streams are synchronized. In addition, the packet assembly unit 2031 of the timing trace generation unit 203 applies and INDEX signal to the packet assembly unit 2021 of the program counter trace generation unit 202. The function of the INDEX signal will be described below.

Referring to FIG. 4A, the assembly of timing packets is illustrated. The signals applied to the timing trace generation unit 203 are the CLOCK signals and the ADVANCE signals.

The CLOCK signals are system clock signals to which the operation of the central processing unit 200 is synchronized. The ADVANCE signals indicate an activity such as a pipeline advance or program counter advance (( )) or a pipeline non-advance or program counter non-advance (1). An ADVANCE or NON-ADVANCE signal occurs each clock cycle. The timing packet is assembled so that the logic signal indicating ADVANCE or NON-ADVANCE is transmitted at the position of the concurrent CLOCK signal. These combined CLOCK/ADVANCE signals are divided into groups of 8 signals, assembled with two control bits in the packet assembly unit 2031, and transferred to the FIFO storage unit 2032.

Referring to FIG. 4B, the trace stream generated by the timing trace generation unit 203 is illustrated. The first (in time) trace packet is generated as before. During the assembly of the second trace packet, a SYYN ID signal is generated during the third clock cycle. In response, the timing packet assembly unit 2031 assembles a packet in response to the SYNC ID signal that includes the sync ID number. The next timing packet is only partially assembled at the time of the SYNC ID signal. In fact, the SYNC ID signal occurs during the third clock cycle of the formation of this timing packet. The timing packet assembly unit 2031 generates a TIMING INDEX 3 signal (for the third packet clock cycle at which the SYNC ID signal occurs) and transmits this TIMING INDEX 3 signal to the program counter packet assembly unit 2031.

Referring to FIG. 5, the parameters of a sync marker in the program counter trace stream, according to the present invention is shown. The program counter stream sync markers each have a plurality of packets associated therewith. The packets of each sync marker can transmit a plurality of parameters. A SYNC POINT TYPE parameter defines the event described by the contents of the accompanying packets. A program counter TYPE FAMILY parameter provides a context for the SYNC POINT TYPE parameter and is described by the first two most significant bits of a second header packet. A BRANCH INDEX parameter in all but the final SYNC POINT points to a bit within the next relative branch packet following the SYNC POINT. When the program counter trace stream is disabled, this index points a bit in the previous relative branch packet when the BRANCH INDEX parameter is not a logic "0". In this situation, the branch register will not be complete and will be considered as flushed. When the BRANCH INDEX is a logic "0", this value point to the least significant value of branch register and is the oldest branch in the packet. A SYNC ID parameter matches the SYNC POINT with the corresponding TIMING and/or DATA SYNC POINT which are tagged with the same SYNC ID parameter. A TIMING INDEX parameter is applied relative to a corresponding TIMING SYNC POINT. For all but LAST POINT SYNC events, the first timing packet after the TIMING PACKET contains timing bits during which the SYNC POINT occurred. When the timing stream is disabled, the TIMING INDEX points to a bit in the timing packet just previous to the TIMING SYNC POINT packet when the TIMING INDEX value is nor zero. In this situation, the timing packet is considered as flushed. A TYPE DATA parameter is defined by each SYNC TYPE. An ABSOLUTE PC VALUE is the program counter address at which the program counter trace stream and the timing information are aligned. An OFFSET COUNT parameter is the program counter offset counter at which the program counter and the timing information are aligned.

Referring to FIG. 6A, a program counter trace stream for a hypothetical program execution is illustrated. In this program example, the execution proceeds without interruption from external events. The program counter trace stream will consist of a first sync point marker 601, a plurality of periodic sync point ID markers 602, and last sync point marker 603 designating the end of the test procedure. The principal parameters of each of the packets are a sync point type, a sync point ID, a timing index, and an absolute PC value. The first and last sync points identify the beginning and the end of the trace stream. The sync ID parameter is the value from the value from the most recent sync point ID generator unit. In the preferred embodiment, this value in a 3-bit logic sequence. The timing index identifies the status of the clock signals in a packet, i.e., the position in the 8 position timing packet when the event producing the sync signal occurs. And the absolute address of the program counter at the time that the event causing the sync packet is provided. Based on this information, the events in the target processor can be reconstructed by the host processor.

Referring to FIG. 6B, the reconstruction of the program execution from the timing and program counter trace streams is illustrated. The timing trace stream consists of packets of 8 logic "0"s and logic "1"s. The logic "0"s indicate that either the program counter or the pipeline is advanced, while the logic "1"s indicate the either the program counter or the pipeline is stalled during that clock cycle. Because each program counter trace packet has an absolute address parameter, a sync ID, and the timing index in addition to the packet identifying parameter, the program counter addresses can be identified with a particular clock cycle. Similarly, the periodic sync points can be specifically identified with a clock cycle in the timing trace stream. In this illustration, the timing trace stream and the sync ID generating unit are in operation when the program counter trace stream is initiated. The periodic sync point is illustrative of the plurality of periodic sync points that would typically be available between the first and the last trace point, the periodic sync points permitting the synchronization of the three trace streams for a processing unit.

Referring to FIG. 7A, the general technique for reconstruction of the trace streams is illustrated. The trace streams originate in the target processor 12 as the target processor 12 is executing a program 1201. The trace signals are applied to the host processing unit 10. The host processing unit 10 also includes the same program 1201. Therefore, in the illustrative example of FIG. 6 wherein the program execution proceeds without interruptions or changes, only the first and the final absolute addresses of the program counter are needed. Using the advance/non-advance signals of the timing trace stream, the host processing unit can reconstruct the program as a function of clock cycle. Therefore, without the sync ID packets, only the first and last sync markers are needed for the trace stream. This technique results in reduced information transfer. FIG. 6 includes the presence of periodic sync ID cycles, of which only one is shown. The periodic sync ID packets are important for synchronizing the plurality of trace streams, for selection of a particular portion of the program to analyze, and for restarting a program execution analysis for a situation wherein at least a portion of the data in the trace data stream is lost. The host processor can discard the (incomplete) trace data information between two sync ID packets and proceed with the analysis of the program outside of the sync timing packets defining the lost data.

As indicated in FIG. 6A, the program counter trace stream includes the absolute address of the program counter for an instruction. Referring to FIG. 7B, each processor can include a processor pipeline 71. When the instruction leaves the processor pipeline, the instruction is entered in the pipeline flattener 73. At the same time, an access of memory unit 72 is performed. The results of the memory access of memory unit 72, which may take several clock cycles, is then merged the associated instruction in the pipeline flattener 73 and withdrawn from the pipeline flattener 73 for appropriate distribution. The pipeline flattener 73 provides a technique for maintaining the order of instructions while providing for the delay of a memory access. In the preferred embodiment, the absolute address used in the program counter trace stream is the derived from the instruction of leaving the pipeline flattener 71. As a practical matter, the absolute address is delayed by an appropriate number of cycles. It is not necessary to use a pipeline flattener 73. The instructions can have appropriate labels associated therewith to eliminate the need for the pipeline flattener 73.

In the preferred embodiment, the state machine operates in three states, a program execution state (also known as a primary or a background state), a interrupt service routine state (also known as a secondary or foreground state) and a halt or break state. In the program execution state, program instructions are executing in the central processing unit. In the interrupt service routine state, interrupt service routine instruction are executing on the central processing unit hardware. And in the halt or break state, the pipeline of the central processing unit is not executing instructions and test and debug procedures can be implemented.

Figure 8A:
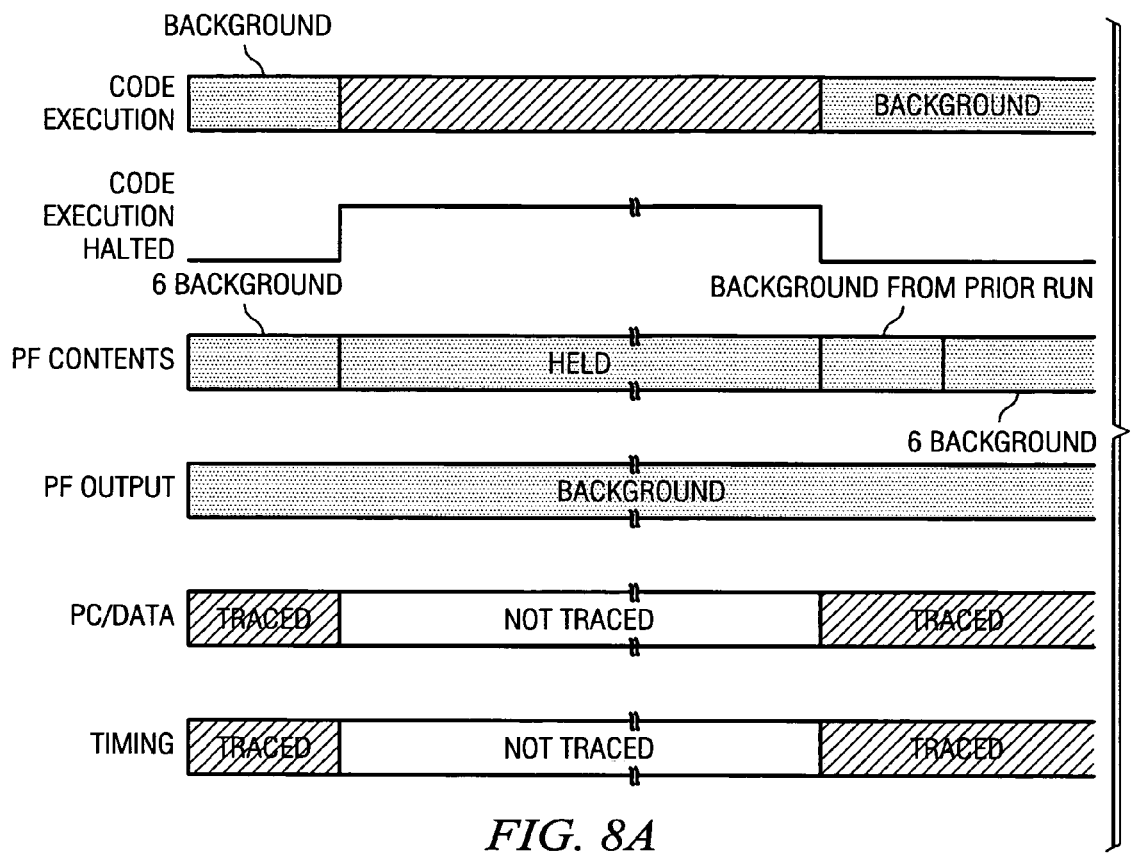
Figure 8B:
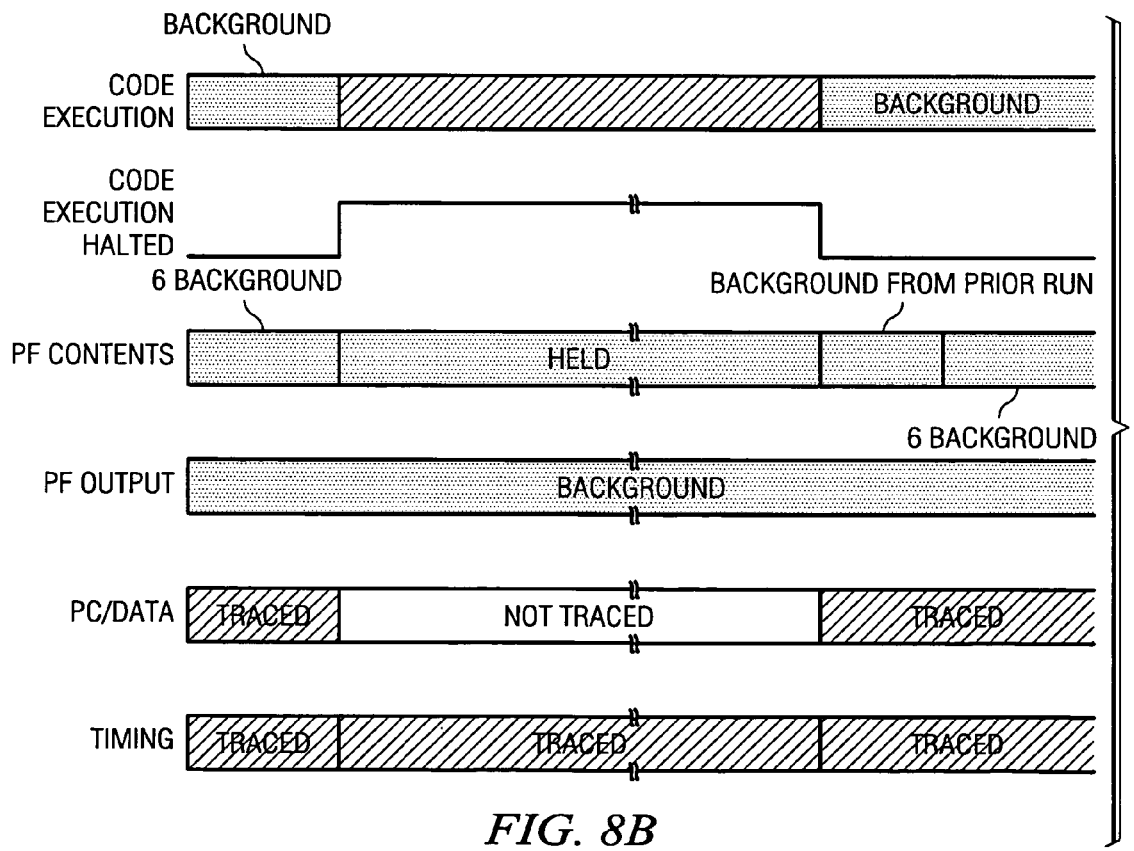
Figure 8C:
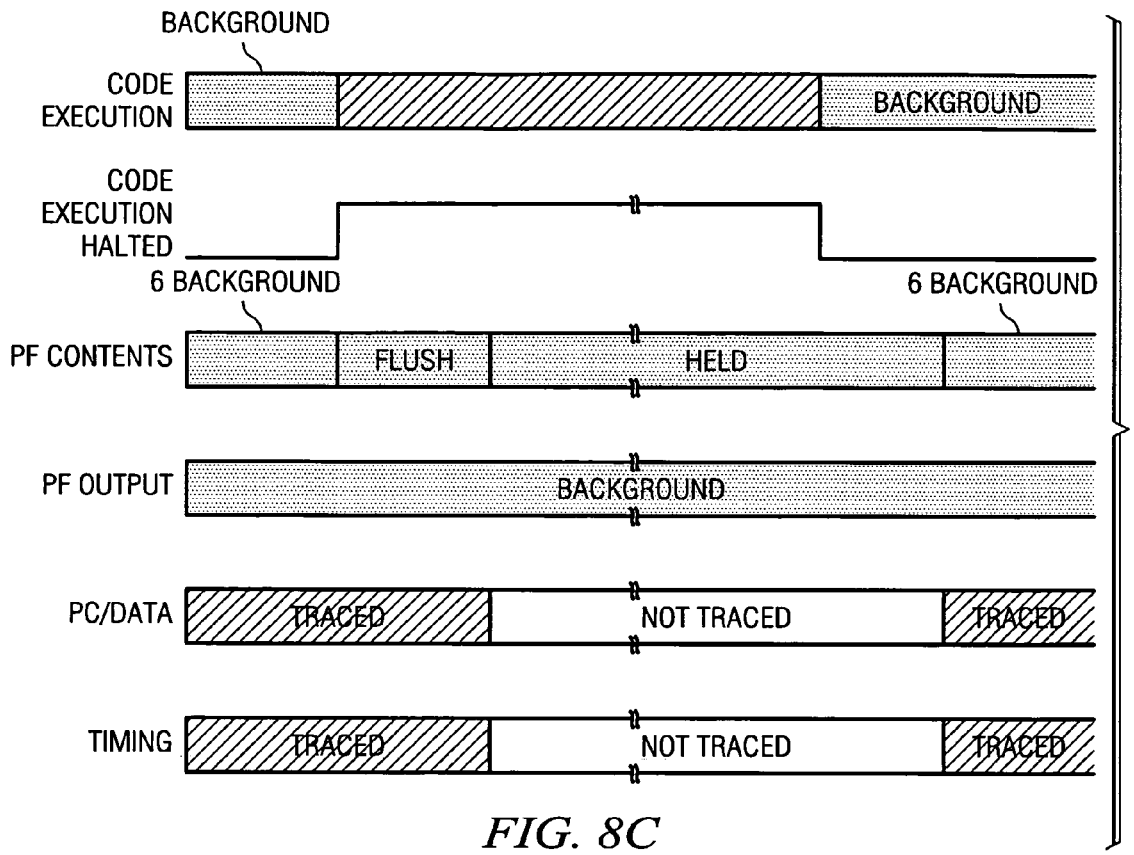
FIGS. 8C and 8D illustrate the non-generation and generation of a timing trace stream with no program counter and data trace streams during a secondary code execution for a protected pipeline mode of operation.
Figure 8D:
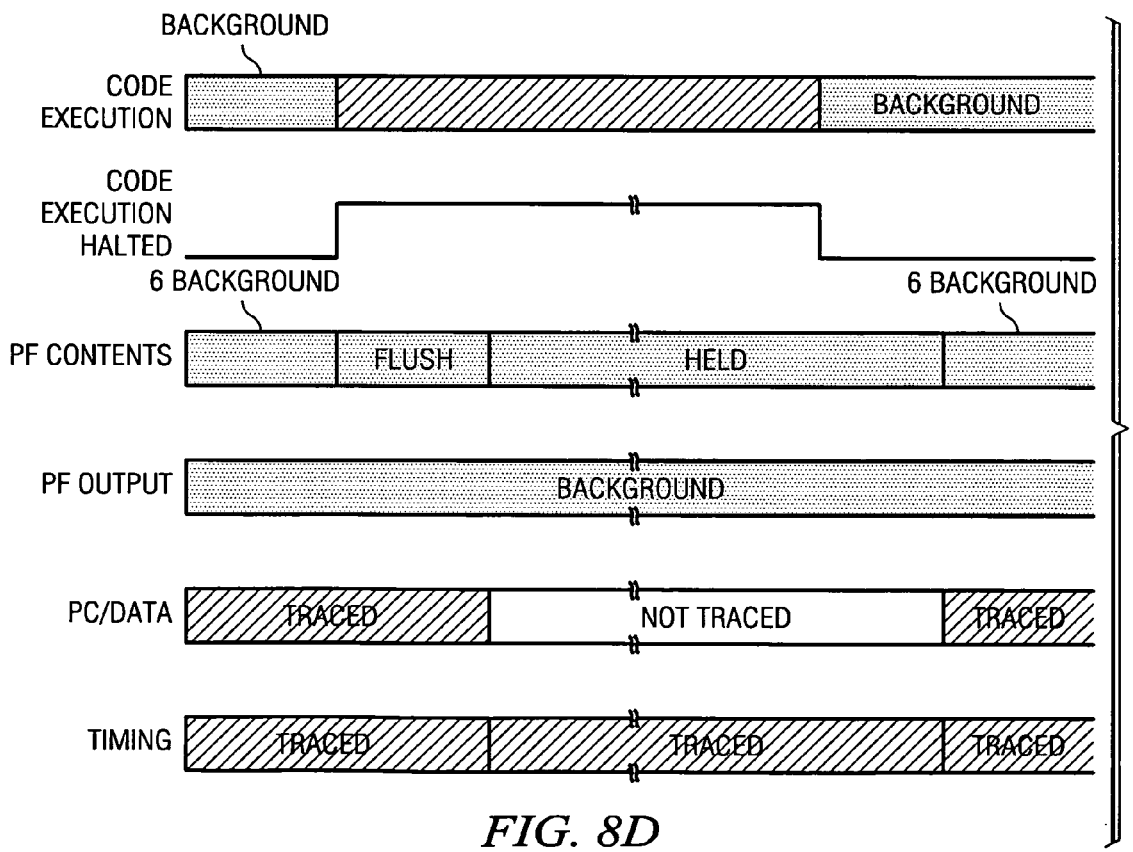

In FIG. 8A though FIG. 8D, the primary code (background) code is halted, but the interrupt service routine code is not executed. Referring to FIG. 8A and FIG. 8B, the effect of a code execution halt is shown for an unprotected pipeline and a pipeline flattener. In FIG. 8A, secondary code is not executed, the timing trace stream and the program counter and data trace streams are excluded and the pipeline flattener is not flushed, i.e., the contents are not removed until the primary code resumes execution in an unprotected pipeline. Note in the pipeline flattener, once the program code execution is resumed, the contents of the pipeline flattener are removed. In the preferred embodiment, the pipeline flattener has 6 stages, the six stages being indicated in the pipeline and being held during the program code execution halt. In FIG. 8B, no secondary program execution is implemented, the timing trace stream is enabled, while the program counter and data trace streams are disabled.

Referring to FIG. 8C and FIG. 8D, the diagrams of FIG. 8A and FIG. 8B are shown with a pipeline flattener flush, i.e., a protected pipeline, at the beginning of a program execution code halt. In FIG. 8C, a timing trace stream, program counter trace stream, and the data trace stream are absent during a program execution while in FIG. 8D, the timing trace stream, but not the program counter and data trace stream, is generated during the program code execution halt. Note that once the program code execution is resumed, 6 clock cycles are required before (non-null) instructions exit from the pipeline flattener.

Figure 9A:
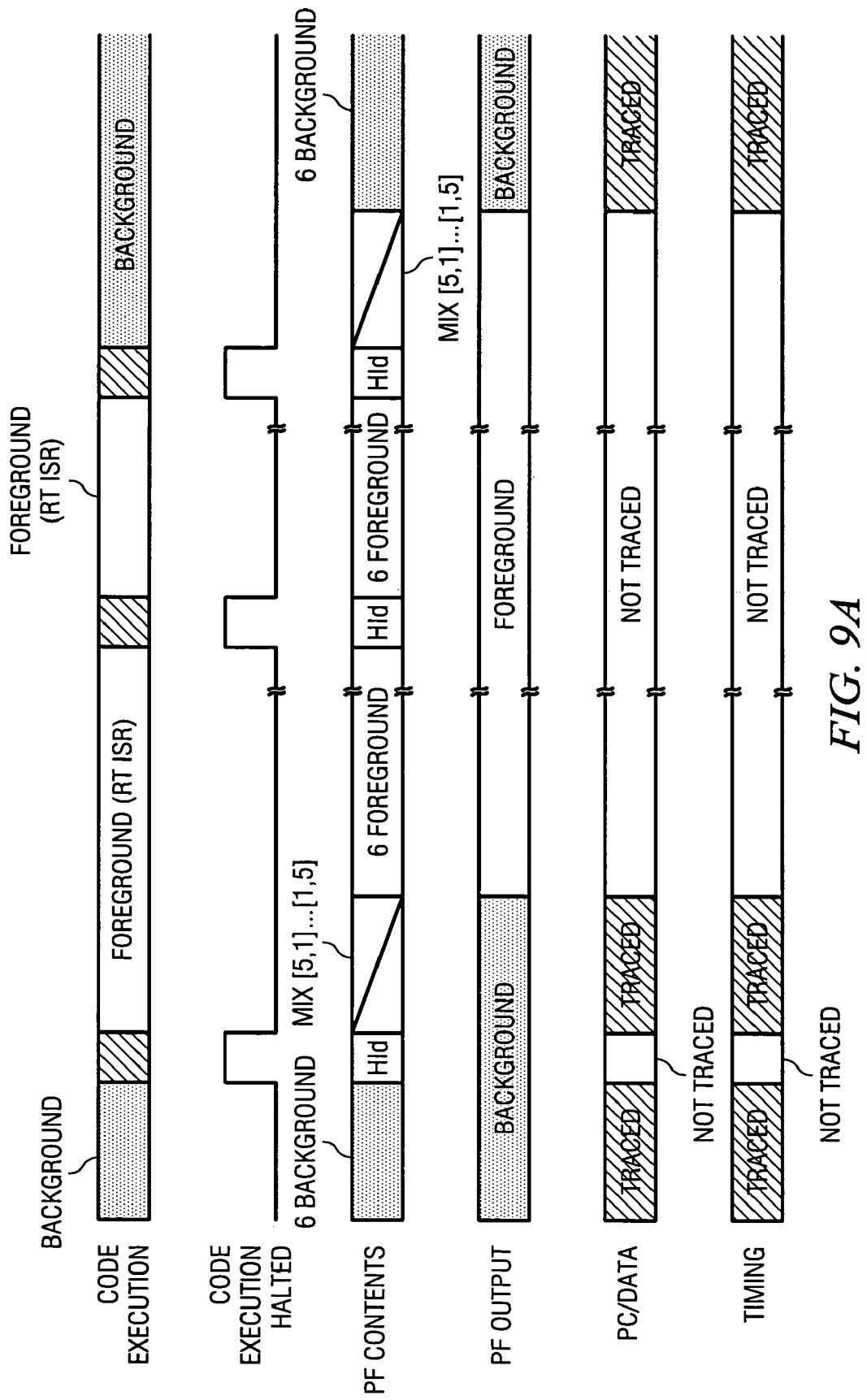
FIG. 9A and FIG. 9B illustrate the effect of program execution stalls on the non-generation and the generation of a timing trace stream with no program counter and data trace streams during secondary code execution for a non-protected pipeline mode of operation.
Figure 9B:
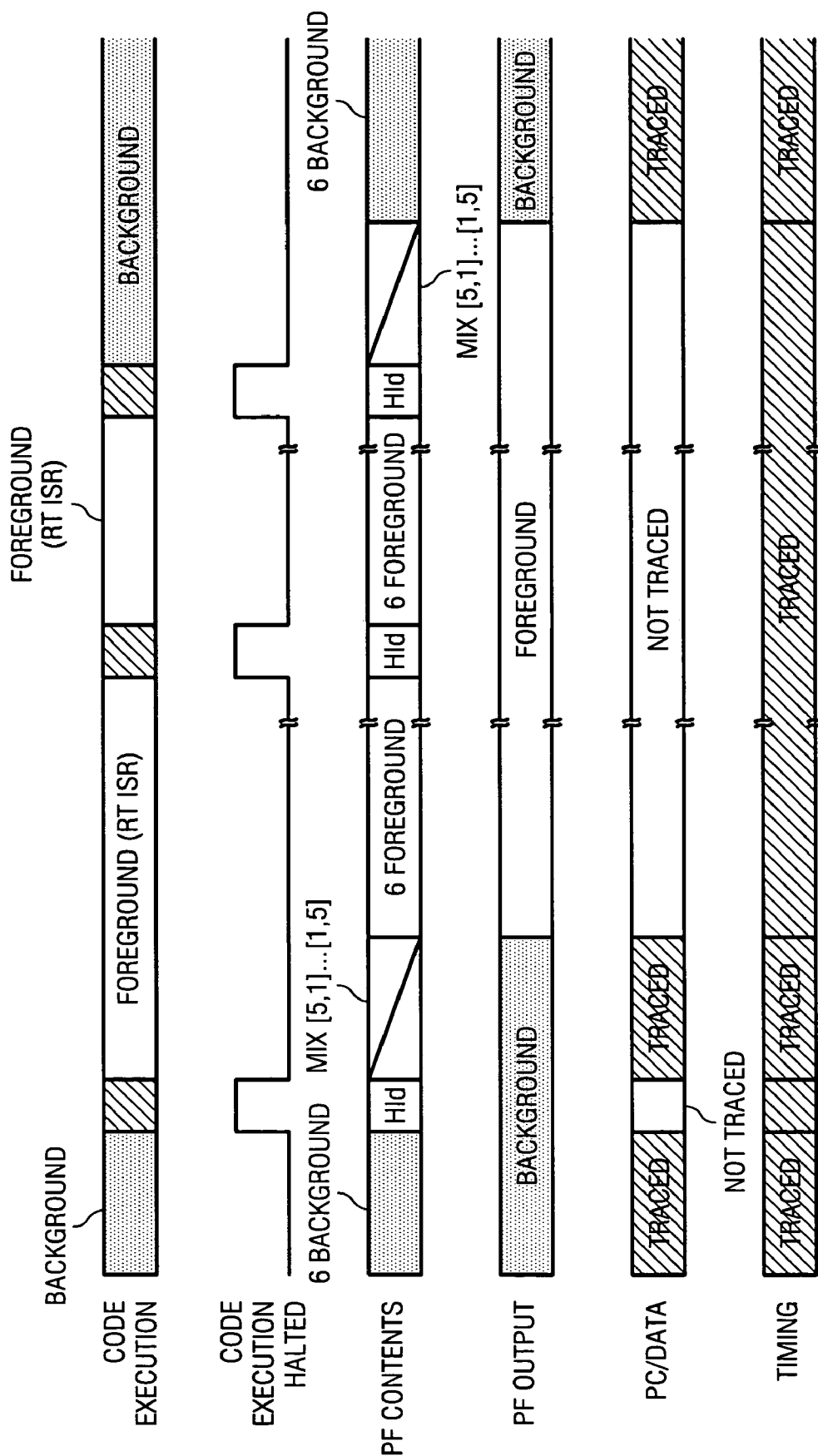
Figure 9C:
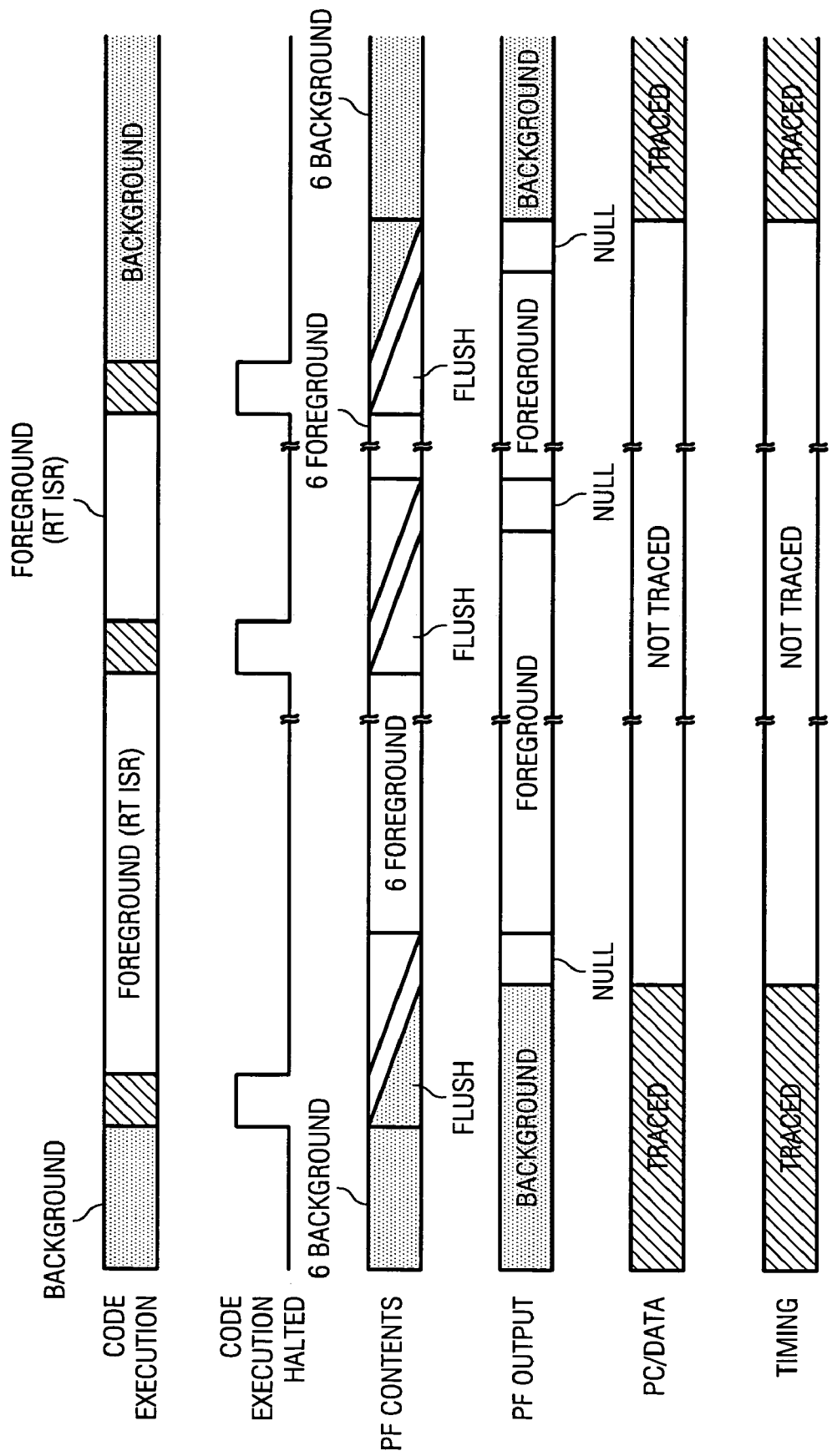
FIGS. 9C and 9D illustrate the effect of program execution stalls on the non-generation and generation of timing trace streams with no program counter and data trace streams during the secondary code execution for a protected pipeline.
Figure 9D:
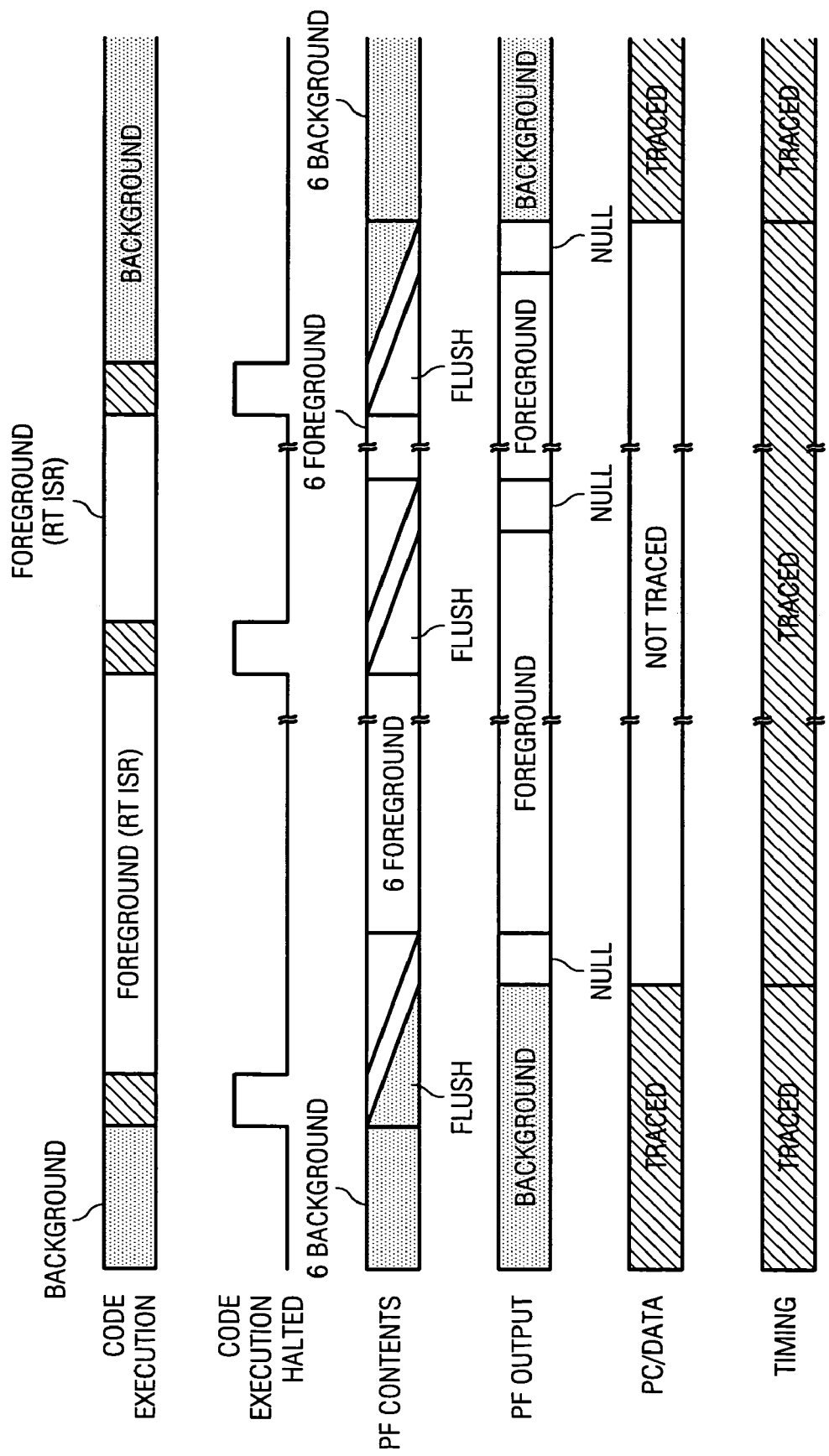
Figure 9E:
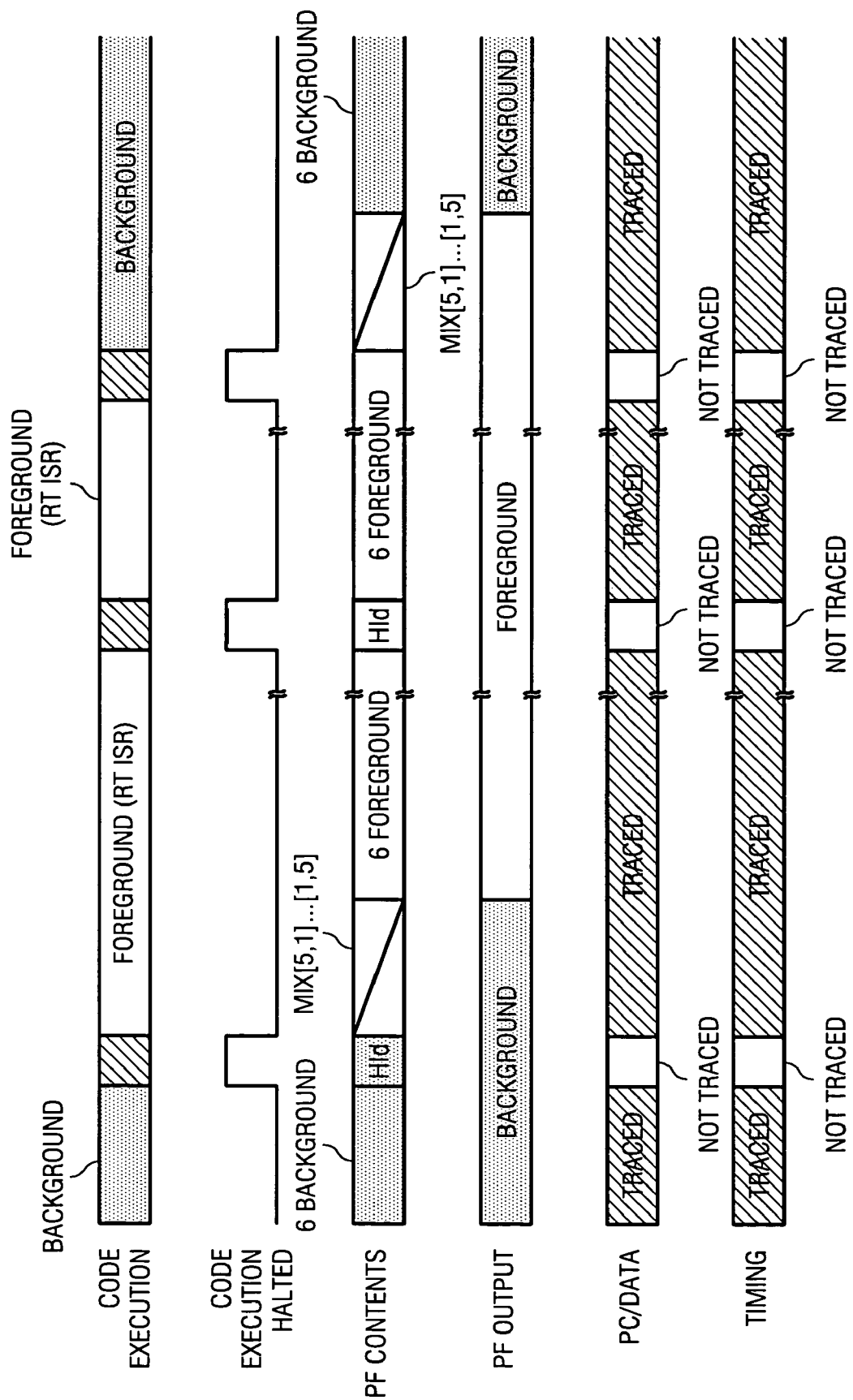
FIGS. 9E and 9F illustrate the effect of program stalls on generation of timing trace streams excluded from and included, respectively, in the program stall intervals where the program counter and the data trace streams are generated during the secondary code execution in a protected pipeline mode.
Figure 9F:
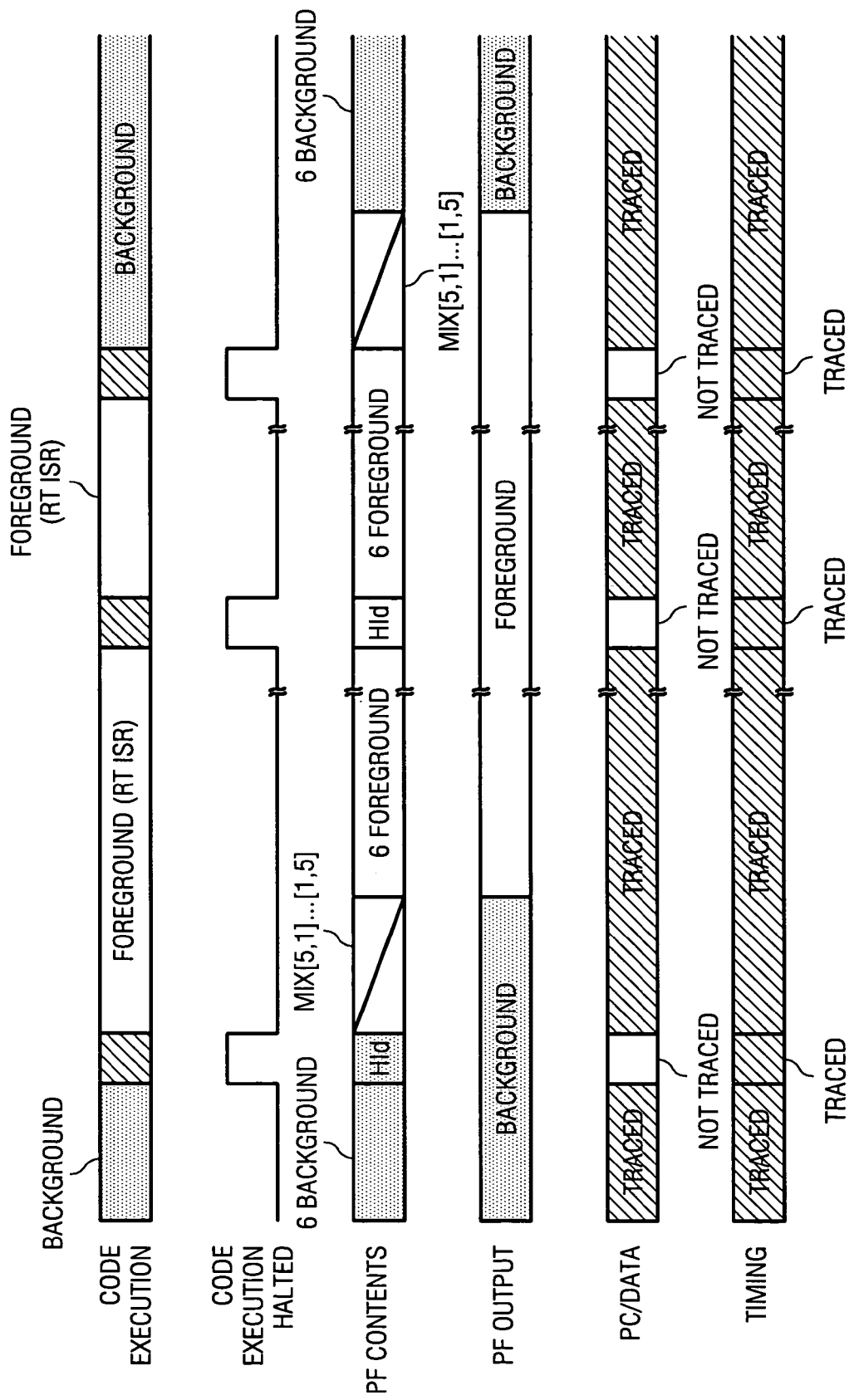
Figure 9G:
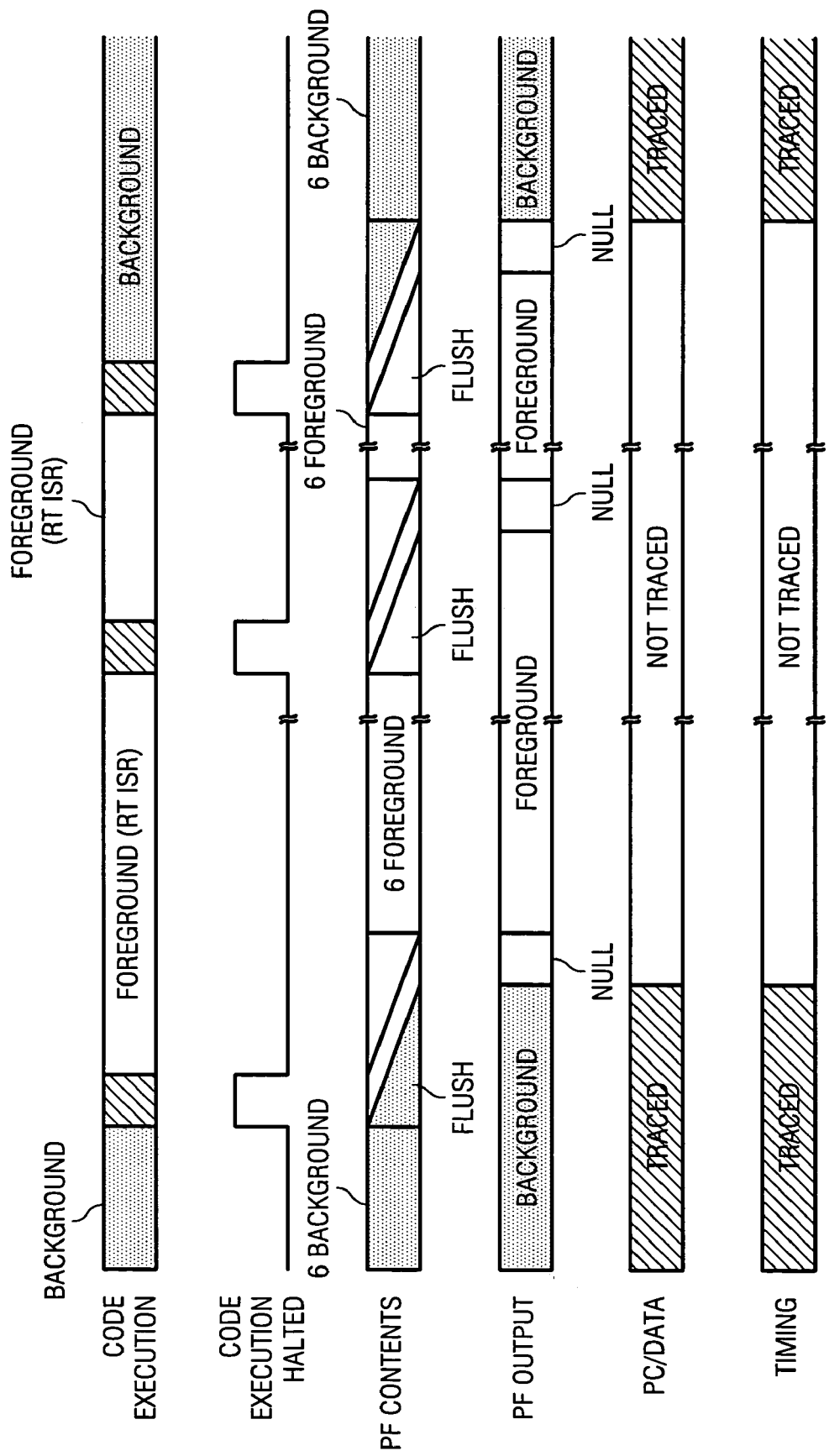
FIG. 9G and FIG. 9H illustrate the effect of halt intervals on the non-generation and the generation of timing trace streams, respectively when the program counter and data trace streams are not present during the secondary code execution during a secondary code execution in a protected pipeline.
Figure 9H:
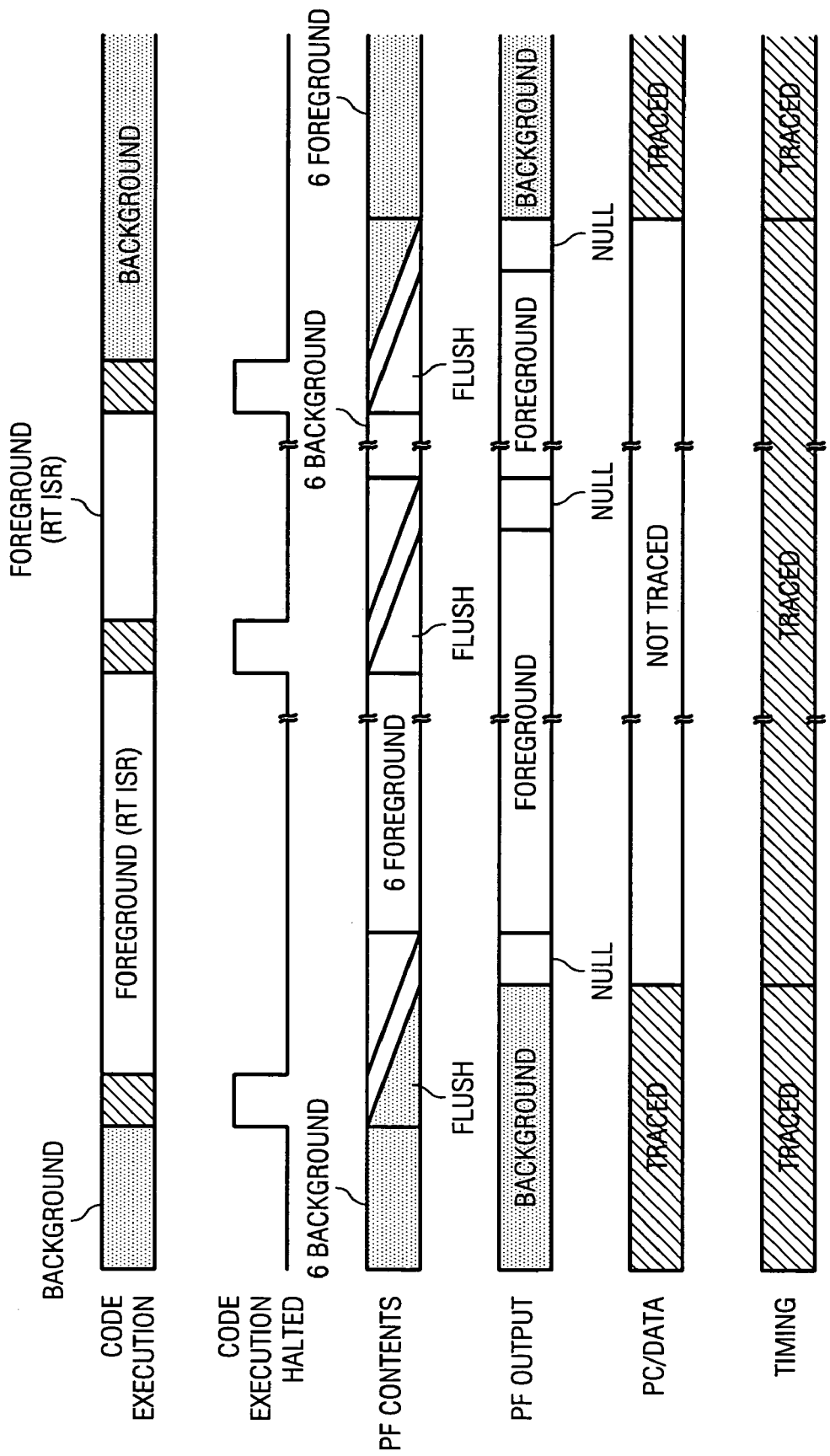

In FIG. 9A through FIG. 9H, after a primary (background) code execution halt, an interrupt service routine (foreground) code is executed. In FIG. 9A through FIG. 9D, the timing trace stream of the interrupt service routine is not traced. Referring to FIG. 9A, the interrupt service routine code is implemented and the timing trace stream, the program counter trace stream and the data trace stream are not enabled. No flush of the pipeline flattener is provided, however, the primary instructions exiting from the pipeline flattener as a result of the secondary code execution are traced. In FIG. 9B, the primary code execution is halted and the timing trace stream is enabled, but not the program counter and the data trace streams, for the interrupt service routine. The timing trace stream is not affected by the code execution halts. The timing trace stream is generated with no flush of the pipeline flattener, i.e., the timing trace stream resumes after the halt and with the initiation of the interrupt service routine. Note that the contents of the pipeline flattener are held during the halt of the code execution. FIG. 9C and FIG. 9D are similar to FIG. 9A and FIG. 9B except that the pipeline is protected. Therefore, the pipeline flattener is flushed, i.e., continues to be emptied immediately, following the code execution halt. In FIG. 9C, no trace stream is enabled, while in FIG. 9D only the timing trace stream is enabled and this trace stream is not affected by the code halts. FIG. 9E and FIG. 9F repeat the activity for an unprotected pipeline found in FIG. 9A and FIG. 9B, respectively, however, with the timing trace stream, the program counter trace stream and the data trace stream for interrupt service routine are enabled. In FIG. 9E, none of the three trace streams are operative during the code execution halt, while in FIG. 9F the timing trace stream is enabled during the code execution halts. FIG. 9G and FIG. 9H repeat the diagrams of FIG. 9E and FIG. 9F, respectively, for a protected pipeline. A pipeline flush after each code execution halt is implemented. No interrupt service routine trace stream is enabled in FIG. 9G. In FIG. 9F, only the timing trace stream is enabled.

2. Operation of the Preferred Embodiment

Using the apparatus of the present invention, the program counter, the data and the timing trace streams can be controlled as determined by the state of the target processor. The interrupt service routine can be optionally included in the program counter/data trace streams. Similarly, the timing trace stream can be optionally included with the code execution halts, whether the interrupt service routine is included in the trace streams or not. In this manner, the user can make most effective use of the trace facilities.

In order to accommodate the delay in access to the memory unit, the instructions are routed through a pipeline flattener. Therefore, during a code execution halt, the pipeline flattener will contain instructions that are still in the process of being executed. The program counter address is delayed to accommodate the delay of the pipeline and the delay of the pipeline flattener. The pipeline flattener is an unprotected pipeline stalls along with the pipeline when the code execution is halted. In a protected pipeline continues to fill with nulls during a code execution halt, thereby expelling the instructions entered in the primary or second code execution state. Although the pipeline flattener expedites the separation of the primary and secondary code execution states, the pipeline flattener is not required for instruction alignment. Tags can be separately associated with program counter values, read activity, and write activity, obviating the need for the pipeline flattener.

The reconstruction of the target processor activity from the trace streams relies on the ability of relate the timing trace stream and the program counter trace stream. This relationship is provided by having periodic sync ID information transmitted in each trace stream. In addition, the timing packets are grouped in packets of eight signals identifying whether the program counter or the pipeline advanced or didn't advance. The sync markers in the program counter stream include both the periodic sync ID and the position in the current eight position packet when the event occurred. Thus, the clock cycle of the event can be specified. In addition, the address of the program counter is provided in the program counter sync markers so that the debug halt event can be related to the execution of the program.

The sync marker trace steams illustrated above relate to an idealized operation of the target processor in order to emphasize the features of the present invention. Numerous other sync events (e.g. branch events) will typically be included in the program counter trace stream.

In the testing of a target processor, large amounts of information need to be transferred from the target processor to the host processing unit. Because of the large amount of data to be transferred within a limited bandwidth, every effort is provided to eliminate unnecessary information transfer. For example, the program counter trace stream, when the program is executed in a straight-forward manner and the sync ID markers are not present, would consist only of a first and last sync point marker.

In the foregoing discussion, the sync markers can have additional information embedded therein depending on the implementation of the apparatus generating and interpreting the trace streams. This information will be related to the parameters shown in FIG. 5. It will also be clear that a data trace stream, as shown in FIG. 2 will typically be present. The periodic sync IDs as well as the timing indexes will also be included in the data trace stream. In addition, the program counter absolute address parameter can be replaced by the program counter off-set register in certain situations.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. In a target processor having three states: a primary code execution state, a secondary code execution state, and an execution halt state, a trace apparatus comprising:
   a trigger unit responsive to user and target processor state input signals corresponding to the three states, the trigger unit generating control signals in response to the input signals;
   timing trace apparatus, the timing trace apparatus responsive to the control signals for selectively providing timing trace streams during the secondary code execution state and the primary code execution state;
   program counter and data trace apparatus, the program counter and data trace apparatus responsive to the control signals for selectively providing program counter and data trace streams during the secondary code execution state when the timing trace apparatus is providing timing trace streams during the secondary code execution state; and
   a test and debug port, the test and debug port adapted for coupling to a communication bus, the test and debug port receiving signals from and sending signals to a host processor unit,
   wherein the control signals individually enable and disable each of the timing trace apparatus and the program counter and data trace apparatus based on a current state of the target processor.

2. The trace apparatus as recited in claim 1 wherein the secondary code execution state is a background or interrupt service routine code execution state.

3. The trace apparatus as recited in claim 1 further comprising a pipeline flattener, the pipeline flattener aligning a program counter address with completion of an instruction, the pipeline flattener flushing instructions in response to a halt execution signal in an unprotected pipeline, the pipeline flattener halting operation in a protected pipeline.

4. The trace apparatus as recited in claim 1 wherein the timing trace stream can be controllably enabled during the execution halt state.

5. A method of generating trace streams in a target processor for transmission to a host processor, the method comprising:
   generating a timing trace stream in the target processor in response to preselected user and target processor input signals;
   when the timing trace stream is being generated, generating a program counter trace stream and a data trace stream in response to predetermined user and target processor input signals; and
   sending the trace streams to the host processing unit over a communication bus,
   wherein the predetermined user and targets processor input signals individually enable or disable the generation of each of the timing trace stream, the program counter trace stream, and the data trace stream based on a current state of the target processor.

6. The method as recited in claim 5 further comprising including in the target processor input signals indicia of the current state of the target processor, the target processor having a primary code execution state, a secondary code execution state and an execution halt state.

7. The method as recited in claim 6 further comprising including in the user input signals whether the timing trace stream is enabled during the secondary code execution state.

8. The method as recited in claim 5 further comprising including in the target processor input signals indicia indicating whether the target processor is in a protected pipeline mode of operation or in an unprotected pipeline mode of operation.

9. The method as recited in claim 5 further comprising including in the user input signals whether the timing trace stream is enabled during instruction execution halts.

10. A processing unit comprising:
    a central processing unit, the central processing unit having three states of operation, a primary code execution state, a secondary code execution state, and an execution halted state; and
    trace generating apparatus including:
        a program counter trace stream generation unit and a data trace stream generation unit, the program counter trace stream generation unit and the data trace generation unit responsive to control signals for generating a program counter trace stream and a data trace stream respectively;
        a timing trace stream generation unit, the timing trace stream generation unit responsive to control signals for generating a timing trace stream;
        a trigger unit responsive to user input signals and to central processing unit signals for generating control signals controlling the timing trace generation unit, the program counter trace generation unit, and the data trace generation unit, wherein the trigger unit is operable to individually enable and disable trace stream generation by each of the program counter trace stream generation unit, the data trace stream generation unit, and the timing trace stream generation unit in response to a current state of operation of the central processing unit; and
        a port for applying selected trace signals to a communication bus.

11. The processing unit as recited in claim 10 wherein the control signals enable the timing trace generation unit during the secondary code execution state.

12. The processing unit as recited in claim 11 wherein the control signals enable the timing trace generation unit, the program counter trace generation unit, and the data trace generation unit during the secondary code execution state.

13. The processing unit as recited in claim 10, wherein indicia of a protected pipeline mode of operation and of an unprotected pipeline mode of operation of the central processing unit are part of the central processing unit input signals.

14. The processing unit as recited in claim 10 wherein the control signals enable the timing trace generation unit during the execution halted state.

15. In a target processor, a trace apparatus comprising:
 a trigger unit responsive to user and target processor state input signals, the trigger unit generating control signals in response to the input signals; timing trace apparatus, the timing trace apparatus responsive to the control signals for selectively providing timing trace streams during secondary code execution;
 program counter and data trace apparatus, the program counter and data trace apparatus responsive to the control signals for selectively providing program counter and data trace streams during secondary code execution when the timing trace unit is providing timing trace streams during the secondary code execution;
 a pipeline flattener, the pipeline flattener aligning the program counter address with the completion of the instruction, the pipeline flattener flushing instructions in response to a halt execution signal in an unprotected pipeline, the pipeline flattener halting operation in a protected pipeline; and
 a test and debug port, the test and debug port adapted for coupling to a communication bus, the test and debug port receiving signals from and sending signals to a host processor unit.

16. In a target processor, a trace apparatus comprising:
 a trigger unit responsive to user and target processor state input signals, the trigger unit generating control signals in response to the input signals;
 timing trace apparatus, the timing trace apparatus responsive to the control signals for selectively providing timing trace streams during a secondary code execution state and a primary code execution state;
 program counter and data trace apparatus, the program counter and data trace apparatus responsive to the control signals for selectively providing program counter trace and data trace streams during the secondary code execution state when the timing trace unit is providing timing trace streams during the secondary code execution state; and
 a test and debug port, the test and debug port adapted for coupling to a communication bus, the test and debug port receiving signals from and sending signals to a host processor unit,
 wherein the target processor has three states, the primary code execution state, the secondary code execution state, and an execution halt state; and
 wherein the trigger unit is responsive to the three states to selectively enable and disable the timing trace apparatus and the program counter and data trace apparatus in accordance with a current state of processor execution; and
 wherein the timing trace stream can be controllably enabled during the execution halt state.

\* \* \* \* \*